M. SCHENKEL.
SYSTEM OF TRANSFORMING DIRECT CURRENT INTO ALTERNATING CURRENT.
APPLICATION FILED MAR. 29, 1917. RENEWED FEB. 9, 1921.
1,390,727. Patented Sept. 13, 1921.
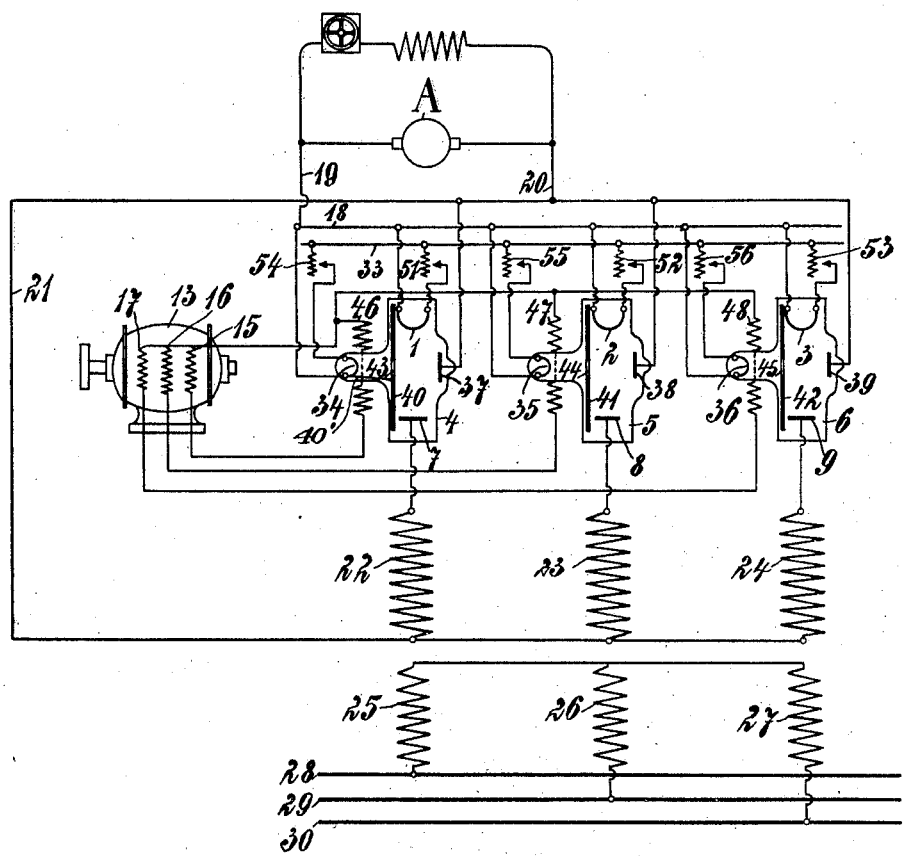

UNITED STATES PATENT OFFICE.

MORITZ SCHENKEL, OF CHARLOTTENBURG, NEAR BERLIN, GERMANY, ASSIGNOR TO SIEMENS SCHUCKERTWERKE, G. M. B. H., OF BERLIN, GERMANY, A CORPORATION OF GERMANY.

SYSTEM OF TRANSFORMING DIRECT CURRENT INTO ALTERNATING CURRENT.

1,390,727. Specification of Letters Patent. Patented Sept. 13, 1921.

Application filed March 29, 1917, Serial No. 158,468. Renewed February 9, 1921. Serial No. 443,726.

*To all whom it may concern:*

Be it known that I, MORITZ SCHENKEL, a citizen of the German Empire, and resident of Charlottenburg, near Berlin, Germany, have invented certain new and useful Improvements in Systems of Transforming Direct Current into Alternating Current, of which the following is a specification.

My invention relates to the transformation of direct current, and more especially high voltage direct current, into single-phase or multi-phase alternating current, such as for instance three-phase or rotary current.

The problem of transforming direct current into alternating current is of particular interest in connection with the transmission of electric energy over long distances inasmuch as the effects of inductivity and capacity are far lower with direct current than with alternating current and may even go down to zero. Likewise the drop of potential in a high voltage direct current transmission line is lower; the saving in copper for the conductors is not less than with alternating current.

The particular object of the present invention is a method and means for effecting said transformation in a more perfect manner than has heretofore been possible. As is well known, alternating current can be transformed into high voltage direct current by means of rectifiers such as mercury vapor apparatus or glow cathode vacuum tubes. It is further known that it is possible to transform direct current into alternating current by the same means, this is to say by aid of rectifiers of the kind mentioned above, this being described for instance in a patent issued to Charles P. Steinmetz on the eleventh of April 1905, #787,228. However many difficulties were encountered in effecting this latter transformation. According to the said method the direct current is fed into the negative electrode or cathode of a vapor electric apparatus provided with a plurality of anodes, the said anodes being connected to the terminals of as many transformers as correspond to the number of phases of the alternating current to be obtained.

However in apparatus of this kind the frequency of the alternating current obtained, which mainly depends, according to Steinmetz, on the size of the different parts of the apparatus, has no constant value, but varies continuously. For this reason the system described does not answer to the requirements of practical use.

According to another method the direct current is fed into an electric vacuum apparatus comprising a cathode, an anode and means for heating the cathode, such apparatus acting like a valve inasmuch as the cathode when hot will allow the current to pass through the apparatus onto the anode, while the same cathode, when cold, will not allow the passage so that then the path of the current is obstructed. By intermittently heating and cooling the cathode the direct current fed into the cathode is allowed to pass through the apparatus in the form of current impulses rapidly succeeding each other, and by sending this pulsatory current alternately into one or the other of a plurality of transformer primaries the direct current may be transformed into multi-phase alternating current. This system, however, has the drawback connected with it that while the heating up of the cathode takes very little time, the cooling proceeds far more slowly, the vacuum and the specific heat of the cathode material preventing a rapid drop of temperature. Now the duration of the single pulsations of current required for the production of alternating current should not exceed a fraction of a second, whereas the changes of temperature of the cathode take much more time and in any case more than a full second. For this reason the systems above described are of no practical value in solving the problem in question.

There is a means, however, of utilizing such apparatus in the transformation of high voltage direct current into alternating current. According to the present invention I obtain the result aimed at by feeding the high voltage direct current into a vacuum apparatus of the sort described and by then varying the conductivity of the space separating the cathode from the anode by any suitable means.

Now it is old *per se* to ionize or to vary the conductivity of the space between cathode and anode of a vacuum apparatus in order to obtain pulsatory currents and I do not claim this step as such. My invention resides in its utilization for the conversion of the current impulses generated within said tube into alternating current by aid of a suitable transformer.

If the pulsations generated in such a vacuum apparatus are transmitted to a transformer, a single-phase alternating current will be produced, whose frequency corresponds to the frequency of pulsations. In order to produce alternating current of any desired number of phases it is only necessary to provide a separate vacuum apparatus and transformer for each phase and to so control the variations of conductivity in the said vacuum apparatus that the passage of current through them takes place in accordance with the single phases.

In carrying out my invention I may for instance employ a vacuum apparatus such as described in German Patent No. 236716, said apparatus consisting of an evacuated vessel, preferably a glass vessel, having sealed therein four conducting members, two cathodes and two anodes, each anode being located opposite a cathode, means being provided for heating the said cathodes. One cathode supplied with the direct current to be transformed, while the other cathode is arranged to emit cathode rays which in passing to the anode arranged opposite to the said cathode cross the path of the direct current discharge and in doing so influence the conductivity of the space separating the direct current cathode from its anode so that the passage of direct current between the two electrodes is alternately brought about and interrupted in rapid succession. By controlling the emission of cathode rays in such a manner that a suitable number of interruptions per second of the direct current passage is effected, the said direct current is changed to a pulsatory current, which on being fed into the primary of the transformer is there transformed into alternating current, the number of phases and frequency of this alternating current depending upon the number of vacuum apparatus and transformer coils and upon the speed at which the generation of cathode rays from the auxiliary cathode is interrupted.

My invention will be described with reference to the drawings which accompany and form a part of the present specification, although it is to be understood that many modifications may be made in the apparatus and system herein described without departing from the principle of my invention.

The single figure of the drawing illustrates my invention diagrammatically.

In the drawing a source of direct current is indicated conventionally at A. From this source is derived a direct current which is to be transformed into three-phase or rotary current. 4, 5, 6 are separate evacuated vessels, preferably glass vessels, inclosing each a cathode 1, 2, 3, an anode 7, 8, 9, an auxiliary cathode 34, 35, 36, an auxiliary anode 37, 38, 39 and a diaphragm 40, 41, 42 interposed between the auxiliary cathode and anode and presenting a central aperture 43, 44, 45 allowing the cathode rays to pass through. The diaphragms may consist either of a non-conductive or of a conductive material and in the latter case they are preferably conductively connected to the auxiliary cathode as shown at 40'. The cathode rays emitted from the auxiliary cathodes 34, 35, 36 are adapted to be deflected by means of magnet coils 46, 47, 48 in such a way as not to pass any more through the central opening of the diaphragm and not to cross the path of the direct current. Whenever the cathode rays are being thus deflected the space separating the cathodes such as 1 and the anodes such as 7 becomes non-conductive and its conductivity is restored only when the cathode rays are again free to cross it in passing from the auxiliary cathode to the auxiliary anode. The periodical deflection of the cathode rays serving to ionize the space between the main cathode and anode is controlled by a switching apparatus such as auxiliary alternating current generator 13, having its three phases 15, 16, 17 connected in star fashion, each phase feeding one of the electromagnets 46, 47, 48 with current.

19, 20 are the direct current mains fed from the generator A, the negative wire 19 being connected to wire 18, while the positive wire 20 is connected by aid of a wire 21 with the star point of transformer primaries 22, 23, 24, the free ends of each primary being connected to one of the anodes 7, 8, 9. 25, 26, 27 are the secondary windings of the three-phase transformer. The wires 18 and 33 are connected to the auxiliary cathodes 34, 35, 36. Rheostats 51, 52, 53 and 54, 55, 56 inserted between wire 33 and the main and auxiliary cathodes respectively, allow of adjusting the temperature of the main and auxiliary cathodes independently of each other.

Upon the cathodes 1, 2, 3 being heated to incandescence and the auxiliary generator 13 exciting the electromagnets, currents of variable force are emitted from the direct current mains 19, 20 into the primary coils 22, 23, 24 of the transformer. These currents will by induction generate alternating currents and alternating voltages in the secondary coils 25, 26, 27 of the transformer, combining into a multi-phase current system which feeds the mains 28, 29, 30. The number of periods in these mains corresponds to the number of periods of the auxiliary generator 13 serving both as a regulator and a switching apparatus. The voltage of the alternating current main will depend upon the ratio of transformation of the transformer and upon the voltage in the direct current mains. The voltage curve in the alternating current mains will correspond to the curve of the generator 13 and can be varied together with and by aid of the said generator.

The particular construction of the vacuum apparatus and the electrodes inclosed therein may be varied in accordance with any well known system of vacuum apparatus such as used as lamps or rectifiers, and the auxiliary devices used in such apparatus, such as the means for cooling the same may be equally applied to the vacuum apparatus used in connection with my invention.

I claim:—

1. A system of transformation of direct current into alternating current, comprising a source of direct current, at least one vacuum apparatus, a primary and secondary transformer winding, a cathode within said vacuum apparatus connected to said source of direct current, an anode within said vacuum apparatus connected to the primary transformer winding, a connection from said source to the free end of said winding, a pair of auxiliary electrodes within said vacuum apparatus arranged to emit cathode rays into the space separating said main cathode and anode, means for supplying said auxiliary cathode with current, and means for intermittently barring and bridging to said cathode rays the passage into the space separating the main electrodes.

2. A system of transformation of direct current into multi-phase alternating current, comprising a source of direct current, a plurality of vacuum apparatuses, a plurality of pairs of transformer windings, a main cathode and a main anode within each vacuum apparatus, the said cathodes being connected to said source of direct current, the said anodes being connected each to a different primary winding of said transformer, an auxiliary cathode within each vacuum apparatus arranged to emit cathode rays into the space separating said main cathodes and anodes, means for supplying said auxiliary cathode with current, means connected with said vacuum apparatus for alternately barring and bridging to the cathode rays in the different vacuum apparatus the passage into the space separating the main electrodes, and a connection from said source of direct current to the middle point of said primary transformer windings.

3. A system of transformation of direct current into alternating current, comprising a source of direct current, at least one vacuum apparatus, a primary and secondary transformer winding, a cathode within said vacuum apparatus, connected to said source of direct current, an anode within said vacuum apparatus connected to the primary transformer winding, a connection from said source to the free end of said winding, an auxiliary cathode within said vacuum apparatus arranged to emit cathode rays into the space separating said main cathode and anode, means for supplying said auxiliary cathode with current, a diaphragm inserted between said auxiliary cathode and the space separating said main cathode and anode, and means for intermittently preventing the cathode rays emitted from said auxiliary cathode from passing through said diaphragm.

4. A system of transformation of direct current into alternating current, comprising a source of direct current, at least one vacuum apparatus, a primary and secondary transformer winding, a cathode within said vacuum apparatus, connected to said source of direct current, an anode within said vacuum apparatus connected to the primary transformer winding, a connection from said source to the free end of said winding, an auxiliary cathode within said vacuum apparatus arranged to emit cathode rays into the space separating said main cathode and anode, means for supplying said auxiliary cathode with current, a diaphragm inserted between said auxiliary cathode and the space separating said main cathode and anode, and means for intermittently generating a magnetic field around said auxiliary cathode, so as to intermittently deflect said cathode rays, thus preventing them from passing through said diaphragm.

5. A system of transformation of direct current into alternating current, comprising a source of direct current, at least one vacuum apparatus, a primary and secondary transformer winding, a cathode within said vacuum apparatus connected to said source of direct current, an anode within said vacuum apparatus connected to the primary transformer winding, a connection from said source to the free end of said winding, an auxiliary cathode within said vacuum apparatus arranged to emit cathode rays into the space separating said main cathode and anode, means for supplying said auxiliary cathode with current, a diaphragm inserted between said auxiliary cathode and the space separating said main cathode and anode, an auxiliary multi-phase alternating current generator and an electromagnet coil surrounding said auxiliary electrode and connected to said auxiliary generator.

6. A system of transformation of direct current into multiphase alternating current comprising a source of direct current, a plurality of vacuum apparatuses, a plurality of primary and secondary transformer windings, a main cathode and a main anode within each vacuum apparatus, said cathodes being connected to said source of direct current, the said anodes being connected each to a different primary winding of said transformer, a connection from said source of direct current to the middle point of said primary transformer windings, an auxiliary cathode within each vacuum apparatus arranged to emit cathode rays into the space separating said main cathode and anode, means for supplying said auxiliary cathode with current, a diaphragm inserted within each vacuum apparatus between said auxiliary cathode and the space separating said main cathode and anode, and means for intermittently preventing the cathode rays emitted from said auxiliary cathode from passing through said diaphragm.

7. A system of transformation of direct current into multiphase alternating current comprising a source of direct current, a plurality of vacuum apparatuses, a plurality of primary and secondary transformer windings, a main cathode and a main anode within each vacuum apparatus, said cathodes being connected to said source of direct current, said anodes being connected each to a different primary winding of said transformer, a connection from said course of direct current to the middle point of said primary transformer windings, an auxiliary cathode within each vacuum apparatus arranged to emit cathode rays into the space separating said main cathode and anode, means for supplying said auxiliary cathode with current, a diaphragm inserted within each vacuum apparatus between said auxiliary cathode and the space separating said main cathode and anode, and means for intermittently generating a magnetic field around each auxiliary cathode so as to intermittently deflect said cathode rays, thus preventing them from passing through said diaphragm.

8. A system of transformation of direct current into multiphase alternating current comprising a source of direct current, a plurality of vacuum apparatuses, a plurality of primary and secondary transformer windings, a main cathode and a main anode within each vacuum apparatus, said cathodes being connected to said source of direct current, said anodes being connected each to a different primary winding of said transformer, a connection from said source of direct current to the middle point of said primary transformer windings, an auxiliary cathode within each vacuum apparatus arranged to emit cathode rays into the space separating said main cathode and anode, means for supplying said auxiliary cathode with current, a diaphragm inserted within each vacuum apparatus between said auxiliary cathode and the space separating said main cathode and anode, an auxiliary multiphase alternating current generator and a plurality of electromagnet coils surrounding each auxiliary cathode and connected to said auxiliary generator.

MORITZ SCHENKEL.